United States Patent
Walldeen et al.

(10) Patent No.: US 8,244,257 B2
(45) Date of Patent: Aug. 14, 2012

(54) HANDOVER FROM A MACRO CELL BACK TO A FEMTO CELL

(75) Inventors: Thomas Walldeen, Linköping (SE); Tomas Nylander, Värmdö (SE); Jari Tapio Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 182 days.

(21) Appl. No.: 12/524,827

(22) PCT Filed: Feb. 20, 2007

(86) PCT No.: PCT/SE2007/050096
§ 371 (c)(1),
(2), (4) Date: Mar. 25, 2010

(87) PCT Pub. No.: WO2008/103084
PCT Pub. Date: Aug. 28, 2008

(65) Prior Publication Data
US 2010/0197311 A1    Aug. 5, 2010

(51) Int. Cl.
*G06F 15/16*    (2006.01)
(52) U.S. Cl. ........................ 455/444; 455/437
(58) Field of Classification Search ............... 455/422.1, 455/435.2, 436, 437, 442, 444
See application file for complete search history.

(56) References Cited

U.S. PATENT DOCUMENTS
6,801,772 B1    10/2004    Townend

FOREIGN PATENT DOCUMENTS
WO    WO 2005/079083 A1    8/2005
WO    WO 2006/012909 A1    2/2006

OTHER PUBLICATIONS

International Search Report dated Nov. 30, 2007 (4 pages).
3GPP TS 08.08 V8.15.0 (Sep. 2003); Technical Specification; 3rd Generation Partnership Project; Technical Specification Group GSM/EDGE Radio Access Network; Mobile-services Switching Centre—Base Station System (MSC—BSS) interface; Layer 3 specification; (Release 1999); http://www.3gpp.org/ftp/Specs/archive/08_series/08.08/0808/8fo.zip, section 1, 3, 2.19, 3.2.2.17, 3.2.2.27 (138 pages).
3GPP TR 25.931 V7.3.0 (Dec. 2006); Technical Report; 3rd Generation Partnership Project; Technical Specification Group RAN; UTRAN functions, examples on signaling procedures; (Release 7); http://www.3gpp.org/ftp/Specs/archive/25_series/25.931/25931-730.zip, section 1, 7.5.1.2, 7.11.1.3.2 (125 pages).

Primary Examiner — Sam Bhattacharya
(74) Attorney, Agent, or Firm — Myers Bigel Sibley Sajovec, P.A.

(57) ABSTRACT

A method for a cellular network (100) comprising cells (110) of a first kind controlled by corresponding base stations (111), and cells (120-122) of a second kind controlled by corresponding base stations (125-127). The second kind of cells are smaller than the first kind of cells (110). The network (100) comprises functions (140) for control of the base stations, and functions (150) for handing over the control of user terminals (123, 112) between base stations. The method is used when a call in a cell of the second kind (120-122) is handed over to a base station of the first kind. The method lets said control function (140) of the base station of the cell of the second kind send identifying information to the control function (140) of the base station (111) of the first kind, such that if the call is to be handed back to the original base station (125-127), the original base station can be found by the network.

12 Claims, 3 Drawing Sheets

HANDOVER FROM A MACRO CELL BACK TO A FEMTO CELL

TECHNICAL FIELD

The present invention discloses a method for use in a cellular telephony network which comprises a first number of cells of a first kind, each of which is able to accommodate at least a first number of users terminals, with each cell of the first kind being controlled by a base station, and a second number of cells of a second kind, each of which is able to accommodate at least a second number of users terminals, with each cell of the second kind being controlled by a base station.

The cells of the second kind are significantly much smaller than the first kind of cells, and are located in or adjacent to a cell of the first kind, and the network also comprises functions for the control of the base stations and functions for handing over the control of user terminals from one base station to another base station.

The method is intended for use when an ongoing call in a cell of the second kind is handed over to a base station of a cell of the first kind.

BACKGROUND

At present, there is a great deal of interest in the telecommunications field regarding the possibility of providing coverage for cellular telephony systems such as, for example, GSM or WCDMA, in small areas with a limited number of users, from now on generically referred to as Mobile Station, MS, by means of Radio Base Stations, RBSs, with a limited coverage area, sometimes referred to as Femto RBSs.

A Femto RBS would provide normal GSM or WCDMA coverage for the MSs in the cell ("Femto cell") controlled by the Femto RBS, and the Femto RBS would be connected to the Core Network in a way which is similar to a "normal" RBS, i.e. by means of a network node referred to, depending on the type of system, as Base Station Controller, BSC, or Radio Network Controller RNC, from now on generically referred to as BSC. It is at present envisioned that the link between the Femto RBS and the Femto BSC would be by means of some kind of IP based transmission.

The coverage area provided by the Femto RBS is referred to as a Femto cell to indicate that the coverage area is relatively small compared to a normal RBS, a "Macro" RBS.

A Femto BSC would suitably be based on a standard "Macro" BSC and can be provided either as a stand-alone Femto BSC node, i.e. not capable of controlling Macro RBSs, or as a function in a Macro BSC which would enable the Macro BSC to control both Macro RBSs and Femto RBSs.

A main field of application for Femto cells would be homes or offices. As such, there is a problem associated with the Femto cells, mainly caused by the definition of a Femto cell as a cell with a small or very small coverage area as compared to the area covered by "normal" cells: if, for example, a user with a MS in a home which is defined as a Femto cell steps out to mow the lawn, or simply to get some fresh air while conducting a phone call, the system might hand the call to the Macro network. When the user enters the area of the Femto cell again, e.g. moves indoors again, the user will want the call to be handed back to the original Femto cell again.

A problem with the scenario described above, i.e. handing a call back to a Femto cell in which the call originated, is the so called "neighbouring cell lists" in the Macro cells, more precisely i.e. in the Macro BSC. These lists are used by the Macro BSC to configure the MS with measurement reporting information regarding the available RBSs in the area, i.e. RBSs to which the MS might be handed over to.

The main problem is the number of future Femto cells, which is estimated to be in the magnitude of tens of thousands, as opposed to the number of cells that can be included in the neighbouring cell lists: the neighbouring cell lists in UTRAN can currently contain a total of 96 cells, with the neighbouring cell lists in GSM being limited in a similar way. Furthermore, it is not feasible to configure this information statically as the end users will be able to move the Femto RBS on their own to a new location.

SUMMARY

As has emerged from the explanation given above, there is a need for a method by means of which a call which is transferred from the control of a Femto RBS to the control of a Macro RBS can be returned to the original Femto cell again at a later point in time.

This need is addressed by the present invention in that it provides a method for use in a cellular telephony network, which network comprises:
  a first number of cells of a first kind, each of which is able to accommodate at least a first number of users, with each cell being controlled by a corresponding base station, and
  a second number of cells of a second kind, each of which is able to accommodate at least a second number of users, with each cell being controlled by a corresponding base station, The second kind of cells are significantly much smaller than said first kind of cells, i.e. the cells of the second kind can be Femto cells and the cells of the first kind can be the "Macro" cells.

The cells of the second kind are located in or adjacent to a cell of the first kind, as is envisioned for the relationship between Femto and Macro cells.

The network in which the invention is applied will also comprise functions for control of the base stations as well as functions for handing over the control of user terminals from one base station to another base station, and the method of the invention is intended for use when an ongoing call in a cell of the second kind is handed over to a base station of a cell of the first kind.

The method of the invention comprises the steps of letting the control function for the base station of the cell of the second kind send identifying information to the control function of the base station of the first kind, the identifying information being such that if the call is to be handed back to the original base station of the cell of the second kind, this base station can be identified and found by the network.

The invention also discloses a node for use as a Base Station Controller, BSC, in a cellular telephony system, which node comprises means for carrying out the method of the invention.

BRIEF DESCRIPTION OF THE DRAWINGS

The invention will be described in more detail in the following, with reference to the appended drawings, in which.

DETAILED DESCRIPTION

Figure 1:
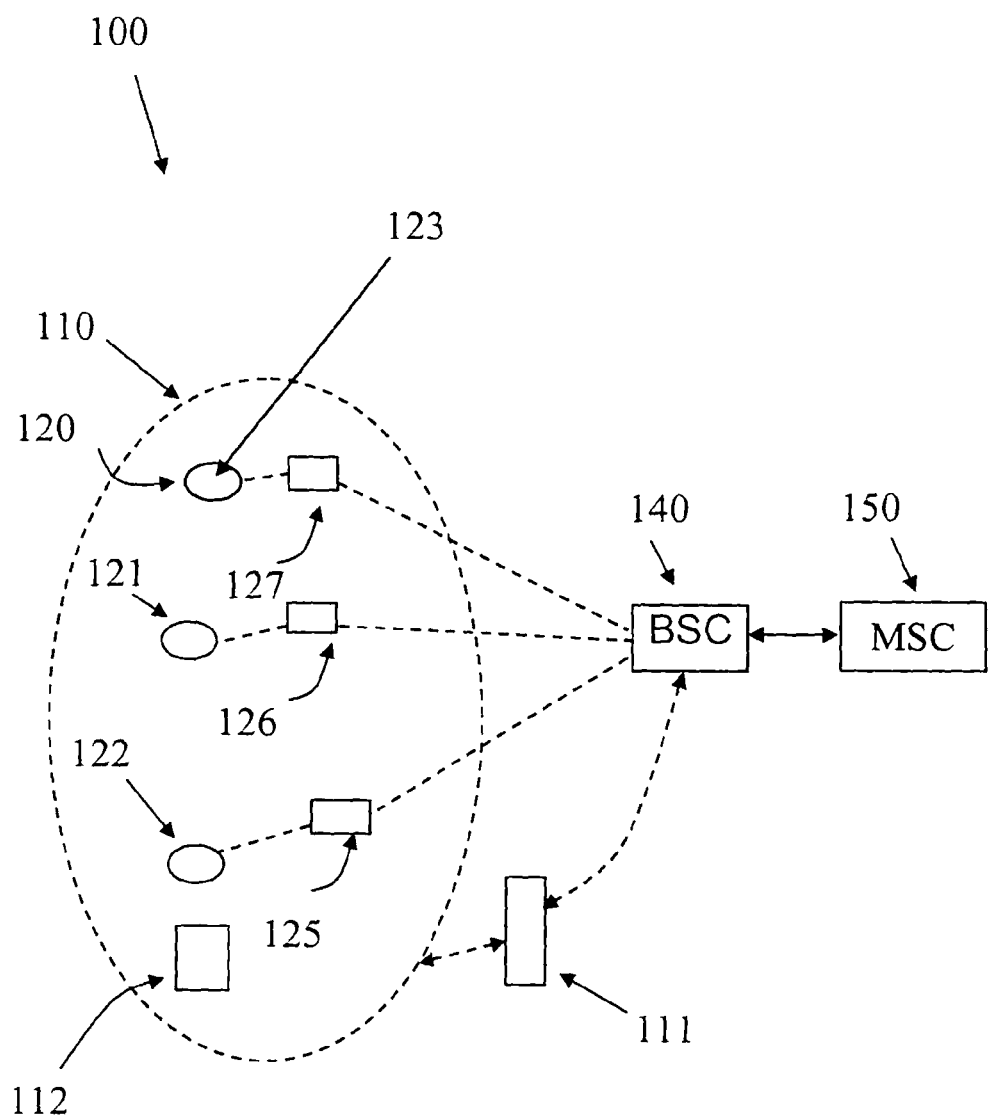
FIG. 1 shows a system in which the invention can be applied.

FIG. 1 shows a system 100 in which the invention may be applied. Before the system 100 is described in more detail, it should be pointed out that although the system 100 will essentially be described as a GSM system, this is by way of example only, and is merely intended to facilitate the reader's understanding of the invention, it is not intended to restrict the scope of protection sought for the present invention. On the contrary, the invention can be applied in a wide range of wireless access systems. In the same manner, although the terminology used in describing the invention will mainly be GSM-terminology, this is also merely by way of example. Thus, the term Radio Base Station refers to a function which in other systems has other names, such as for example, Node B. Such systems are also within the scope of the present invention.

Returning now to FIG. 1 and the system 100 shown there, the system comprises a number of cells of a first kind, i.e. normal or "Macro" cells, one of which is shown as 110, and each of which is controlled by an RBS 111. The Macro cells can accommodate a number of user terminals, one of which is symbolically shown with the reference number 112 in the cell 110.

The system 100 of FIG. 1 also comprises a number of so called "Femto" cells 120-122, each of which is controlled by a "Femto" RBS 125-127. More will be said about the Femto cells and their RBSs later, but as can be seen in FIG. 1, the system 100 also comprises a function, a so called Base Station Controller, BSC, shown with the reference number 140, for the control of the base stations, as well as a function 150, MSC, Mobile Switching Centre, which inter alis, serves to hand over the control of user terminals from one base station to another base station.

In the example shown in FIG. 1, the BSC 140 of the system 100 controls both the base station 111 of the Macro cell 110 and the base stations 125-127 of the Femto cells 120-122. This is a realistic example, but it should be pointed out that the Femto base stations and the Macro base station can also be controlled by different BSCs within the scope of the present invention. It should be pointed out that although FIG. 1 shows an example where one and the same BSC 140, the description below will be with reference to a case where different BSCs control the Macro base station and the Femto base station.

The intended function of the Femto cells 120-122 and their RBSs 125-127 is essentially the same as that of the Macro cell 110 and its RBS 111, and for that reason their function will not be explained in further detail here, but a difference as compared to "traditional" cells and their RBSs is that the Femto cells are intended to cover much smaller areas than a traditional cell such as the cell 110. Typical areas of use for a Femto cell would be a home or a small office.

A typical situation in a Femto cell 120-122 in the system 100 shown in FIG. 1 is that a user via his user terminal 123 in a Femto cell 120 initiates a call or some other kind of session with the system, and in the course of the call the user exits the area of the Femto cell 120, in which case the control of the call will be transferred from the Femto RBS 127 to the control of the RBS 111 of the "Macro" cell 110 by the mechanisms inherent in the system. These mechanisms are well known to those skilled in the field and will thus not be discussed in detail here.

If the user who has exited the area of the Femto cell 120 during the course of the call enters the area of the Femto cell again during the course of the call, the user will wish for the call to be transferred back to the Femto cell again, i.e. that the control of the call should be transferred back to the Femto RBS 127.

A problem with this is that the known systems such as, e.g., GSM and WCDMA do not contain any mechanisms for "tracing" the origin of a call in an easy manner.

Another problem is one inherent in the definition of the Femto cells in the Macro cells, i.e. in the Macro BSC 140 and the Macro RBS 111: Mainly, the problem with this is the definition of the Femto cells 120-122 in the so called neighbouring cell list in the Macro cell 110, i.e. in the Macro BSC 140.

The list is needed for the BSC 140 in order to configure the MS with measurement reporting information, and once the MS detects the Femto cell and reports this to the BSC 140, i.e. when the user enters or comes into the vicinity of the Femto cell 120, the BSC 140 needs to be able to trigger the handover procedure to the Femto cell 120 as defined in the existing system specifications.

The triggering of the handover is normally carried out using cell identification information that would be manually configured for the Femto cells 120-122 when they are defined in the neighbouring cell lists. However, the possible number of Femto cells is estimated to reach the magnitude of tens of thousands if not more, and the number of cells that can be included in the neighbouring cell lists is limited.

For example, the neighbouring cell lists in UTRAN can currently contain 32 cells for each of three different types of cells, Intra-frequency, Inter-frequency and GSM, i.e. 96 in total, and the neighbouring cell lists are limited in the GSM system in a similar way. Furthermore, it is not feasible to configure this information statically as the end users will be able to move the Femto RBS on their own to a new location, and thereby to another Macro Cell.

In addition, the relevant Cell measurement information (i.e. ARFCN/BSIC for GSM cells and Frequency/Scrambling Code for WCDMA cells) needs to be reused among the Femto Cells. This means that even if the Femto cells could be added to the neighbouring cell lists, the BSC would not be able to know which the correct target cell is when the MS reports a Femto cell using information that is reused among the Femto Cells.

Thus, the invention aims at alleviating the problem illustrated above, i.e. how to ensure a hand over from a Macro cell back to a Femto cell in which the call was originally established.

A basic concept according to the invention, in order to solve this problem is that when a Femto BSC triggers a hand over to a Macro cell, it includes information about the Femto cell in which the call was established, and in which the call is ongoing prior to the hand over. The information in question is transmitted transparently via the MSC 150 to the Macro BSC in a manner which will be explained in more detail below. The information which is included by the Femto BSC comprises the Measurement Information, Routing Information and Local Information for the Femto cell. This information will be described in more detail in the following, but comprises, inter alia, the following:

Measurement Information: Information which allows the MS to measure the Femto cell, and which allows the network to identify the measurements as belonging to the specific Femto cell in question. Other parameters on how to handle the measurements can also be included.

Routing Information: Information which will allow the MSC to route a subsequent handover to the correct BSC. For example, in a GSM system, this would be the CGI, Cell Global Identification. The CGI will in this case thus not identify a "real" cell, but can be said to identify a "virtual" cell supported by a BSC.

Local Information: Information which together with the routing information identifies a specific Femto cell within a Femto BSC.

The above information is transmitted transparently by the Femto BSC to the Macro BSC. The Macro BSC adds the received Femto cell to the active mode neighbouring cell list, using the received Measurement Information.

When or if the Macro BSC triggers handover back to the Femto layer, the Routing Information is used by the network to route the request to the correct Femto BSC, and when the Femto BSC receives the handover request, it uses the Local Information to identify the specific Femto cell.

Figure 3:
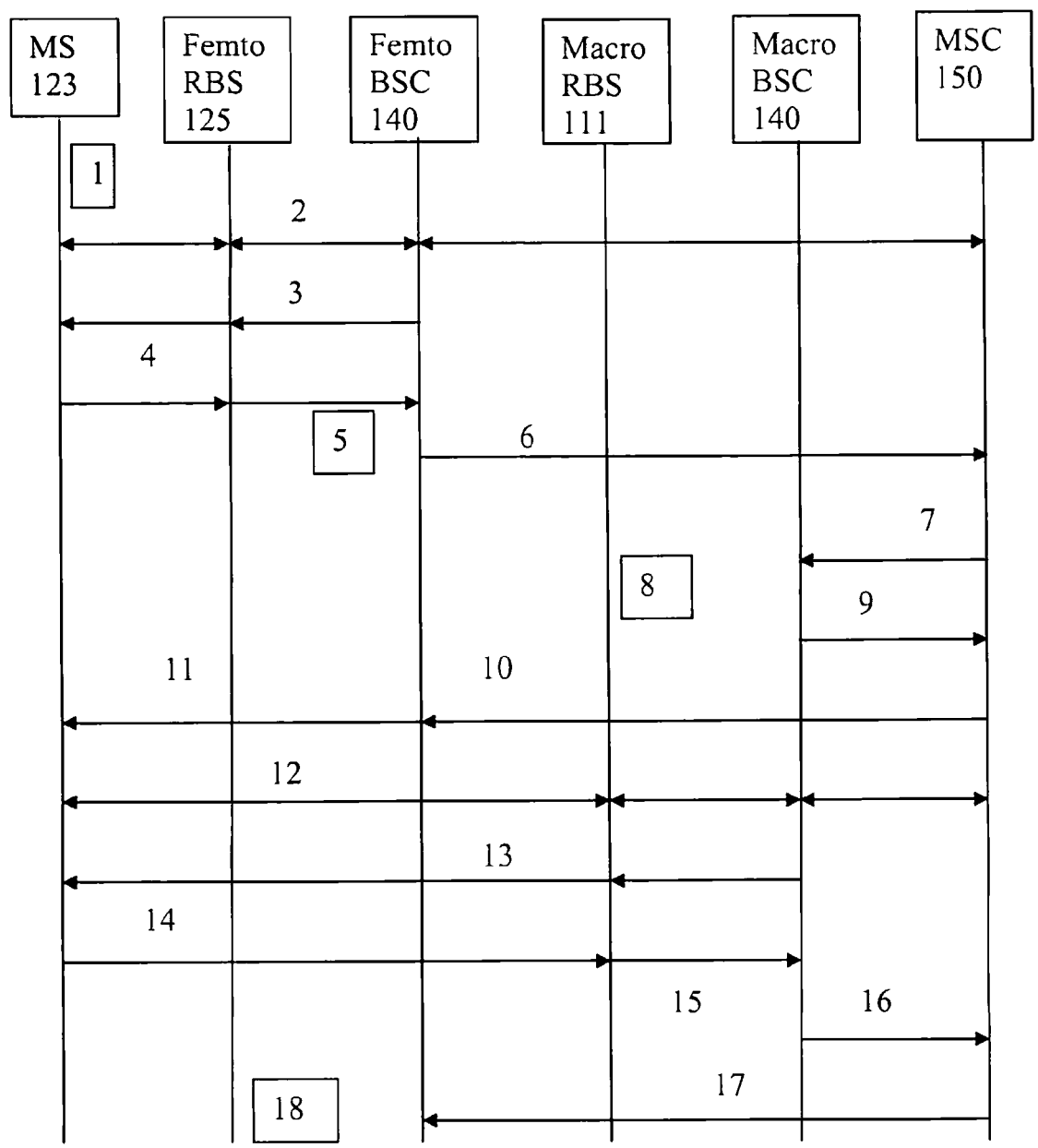
FIG. 3 shows a sequence diagram of a method of the invention.

A possible sequence using the invention will now be described in more detail with reference to the sequence diagram in FIG. 3, which shows the signalling sequence for a scenario when a call is initially established in a Femto cell, subsequently handed over to a Macro Cell, and then handed back to the Femto Cell in which the call was established, the "original" Femto cell. The numbers used below correspond to those shown in FIG. 3.

Also, reference will be made to the system components shown in FIGS. 1 and 2, with reference numbers taken from those figures.

Figure 2:
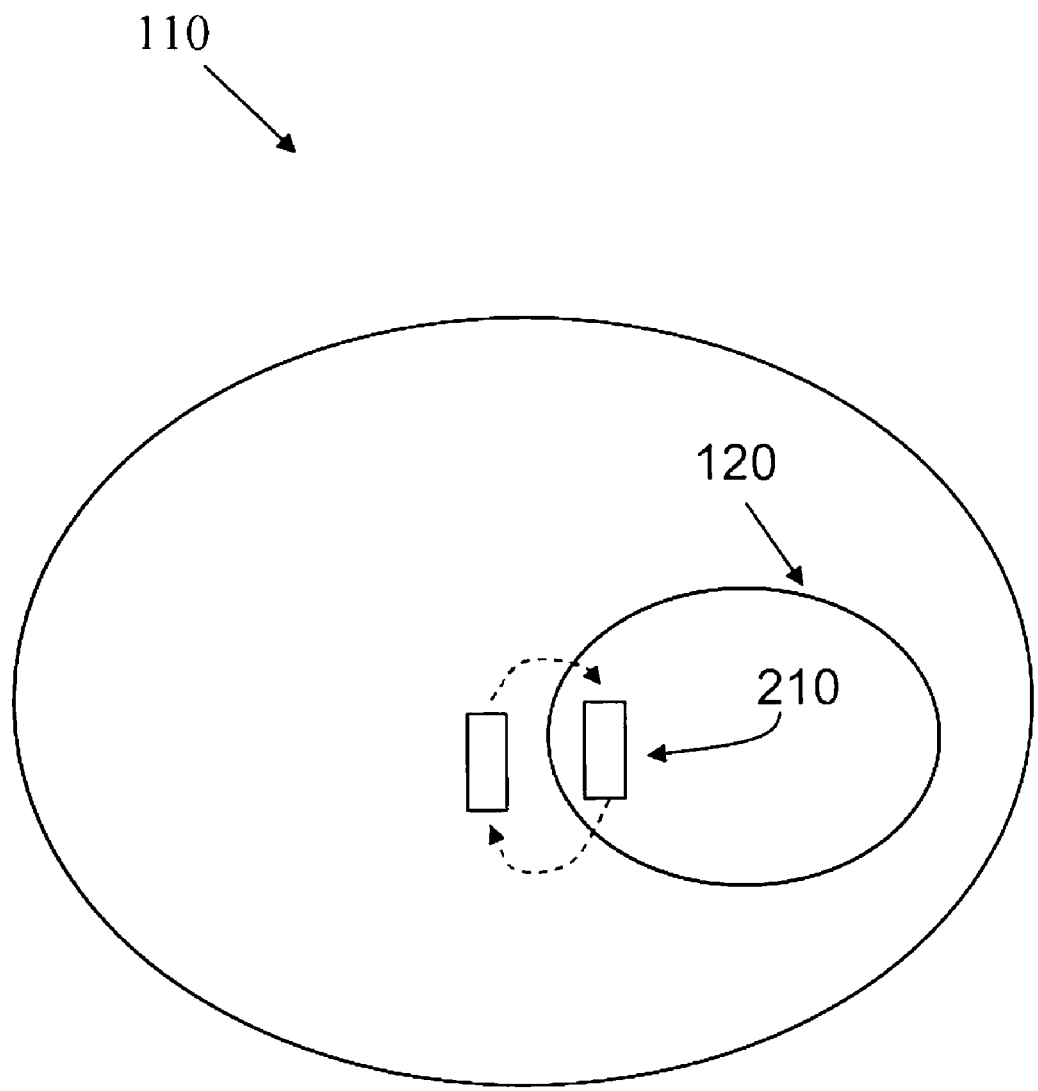
FIG. 2 shows a principle of the invention.

1) The MS 210 of FIG. 2 is initially camped on a Femto cell such as the Femto Cell 120 in FIGS. 1 and 2. It can be mentioned here that it is assumed in the example that the network configuration is such that the Macro cell 110 is a neighboring cell to the Femto cell 120.

2) A call is established by the MS 210.

3) As part of 2), the MS 210 is configured with the active mode neighbouring cell list, which is done in the manner which is normal for the system 10 in question, so that, for example, for the GSM system, the so called System Information 5 is used for this. The Macro Cell 110 is included in the active mode neighbouring cell list in the BSC 140.

4) The MS 210 sends measurement reports to the Femto BSC according to existing principles of the system 100.

5) According to the information comprised in the measurement reports from the MS 210, the Femto BSC 140 decides that it is time to perform handover of the MS 210 from the Femto Cell 120 to the Macro Cell 110.

6) The Femto BSC 140 prepares a hand over message, according to the normal standard of the system 100, which in a GSM system would be a HANDOVER REQUIRED (BSS-MAP) message. However, according to the invention, a new field is defined for the message, said new information in a GSM system being suitably comprised in the information element "Old BSS to New BSS information".

The main principle of the new field is that it can be used to carry information to the new/target BSC about one or more Femto Cells 120-122, by means of which the originating Femto cell can be found again in a hand over situation. The information comprised in the new field will suitably consist of e.g. Measurement information (e.g. ARFCN/BSIC), Routing Information (e.g. a CGI) and a Local identifier for each GSM cell, i.e. each Femto cell, within its host BSC. This information can be for one Femto cell or it can be repeated for a number of Femto cells.

In addition, if the invention is applied in a GSM system, the GSM band, i.e. GSM 1800 or GSM 1900, needs to be indicated for the ARFCN (Absolute Radio Frequency Channel Number) if the ARFCN doesn't indicate this. The measurement information can also include data to control the handover, e.g. handover hysteresis and offsets. A specific "Ping-pong-prevention timer" value can also be included to indicate that it is preferred not to trigger handover back to the Femto cell during the time interval indicated by this value unless absolutely needed, e.g. unless certain criteria are met.

Only one cell, the Femto Cell 120, is included in this example with the following information: Measurement information {ARFCN-x and BSIC-y}, Routing Information (CGI-z) and Local Information (local identifier-k), with the letter x, y, z and k being indicative of the specific cell 120.

The hand over message, in the present example the (BSS-MAP) HANDOVER REQUIRED message, is sent to the MSC 150 by the BSC 140.

7) The MSC 150 routes the received Handover required indication to the correct Macro BSC 140 by sending the (BSSMAP) HANDOVER REQUEST to that BSC. The "Old BSS to New BSS information" IE is copied from the HANDOVER REQUIRED message to this message.

8) According to the invention, in addition to its existing functions, the Macro BSC 140 is equipped with a function which enables it to use the information received in the new field in the "Old BSS to New BSS information" IE to configure the active mode neighboring cell list for the MS 210 to also include the Femto Cell 120. The Femto Cell 120 is also dynamically defined as a neighboring cell to the Macro cell in the Macro BSC 140. Suitably, the new function is a software function in the BSC 140, but the function can also, if desired be designed in hardware or in a suitable combination of software and hardware.

9) The Macro BSC 140 returns a (BSSMAP) HANDOVER REQUEST ACKNOWLEDGE message to the MSC 150.

10) The MSC 150 returns a (BSSMAP) HANDOVER REQUIRED ACKNOWLEDGE message to the Femto BSC 140.

11) The Femto BSC 140 sends a (GSM RR) HANDOVER COMMAND to the MS 210.

12) Handover from the Femto Cell 120 to the Macro Cell 110 is performed according to existing principles of the system in question, i.e. in the example the GSM system.

13) The MS 210 receives the S15 in the Macro Cell 110 regarding the active mode neighbouring cells. This message contains also information about the Femto Cell 120, which will enable measurements of the Femto Cell 120.

14) The MS 210 sends measurement reports to the Macro BSC 140 according to existing principles.

15) By means of the measurement reports from the MS 210, the Macro BSC 140 can at a later point in time decide that it is time to perform handover from the Macro Cell 110 back to the Femto Cell 120, i.e. the originating Femto cell. If other handovers should occur, for example to another Macro cell, then the previously received extra information field should also be included. This will allow handover back to the originating Femto cell from any later visited cell.

16) If the Macro BSC 140 decides to hand over the MS 210 back to the Femto cell 120, the Macro BSC 140 will prepare a (BSSMAP) HANDOVER REQUIRED message, as defined in the GSM system. However, the target cell is the Femto Cell 120, and the Macro BSC 140 previously received the new field in the "Old BSS to New BSS information" IE when handover was performed from the Femto cell 120. The Macro BSC 140 now, according to the invention, uses that information in the following manner: The target cell 120 for the HANDOVER REQUIRED message is taken from the Routing Information part of the new field (i.e. CGI-z). In addition, the entire "Old BSS to New BSS information" IE is included as received previously.

The (BSSMAP) HANDOVER REQUIRED message is also sent to the MSC 150 by the BSC 140.

17) The MSC 150 routes the received Handover required indication to the correct Femto BSC 140 by using the routing information, and sends the (BSSMAP) HANDOVER REQUEST to that BSC. An example of such routing information is CGI-z, with "z" being an indicator that enables identification of the BSC in which the Femto cell 120 is located. In other words, the 'target cell information' in this message will be the 'virtual cell' identified as CGI-z, given as Routing Information. The "Old BSS to New BSS information" IE is copied from the HANDOVER REQUIRED message to the Request message.

18) According to the invention, the Femto BSC 140 is equipped with a function for using the received information in the new field of the "Old BSS to New BSS information" IE in the following manner: The target cell 120 in the message, i.e. the "virtual cell" identified by CGI-z, is used together with the Local Information, i.e. local Identifier-k, to identify the target Femto cell 120. The Handover procedure will apart from this be carried out according to the existing standard of the system in question.

The principles described above in items 1-18 can be applied in other cases as well, for example in hand over and subsequent "hand in" between GSM Femto cells and WCDMA-Macro cells, or WCDMA Femto cells and WCDMA-Macro cells, as well as between WCDMA Femto cells and GSM-Macro cells. In all of these applications, the specific messages and IEs identified above in items 1-18 may be referred to by different names, but the main principle described above can still be applied in all of the systems mentioned.

For example, the "Old BSS to New BSS information" IE and the new field are used when the Femto Cell is a GSM-like cell. If the Femto cell is a WCDMA-like cell, then the "Source RNC To Target RNC Transparent Container" IE and a new Field may be used for corresponding functions.

Regarding the new field which has been mentioned above and which is comprised in the invention, some more details will now be given as to a preferred implementation of that field. As has been mentioned, in the GSM case, the new field should be defined for the "Old BSS to New BSS information" IE, and for the WCDMA case it should be defined for the "Source RNC To Target RNC Transparent Container" IE.

The new Field, referred to as, for example, Extended Source Cell information, could be defined according to the following:

The number of Femto cells included in this instance of the field.

For each Femto cell included:
For Femto cells which are GSM cells, Measurement Information such as:
ARFCN and BSIC
Optionally band for the ARFCN
Handover control data (e.g. hysteresis and offsets values and ping-pong-prevention timer)
For Femto cells which are WCDMA cells, measurement Information such as:
UTRAN frequency and Scrambling Code.
Handover control data (e.g. hysteresis and offsets values and ping-pong-prevention timer)
Routing Information (CGI for GSM Femto-cells, and for WCDMA Femto-cells for example an identifier such as PLMN-ID+LAC+RNC-ID+Cell identifier), and
Local Information, such as for example, a 16-bit local identifier. This is the local identifier "k" described above.

The Measurement information part is used, as described above, to add the Femto Cell or cells dynamically to the active mode neighbouring cells list, and then by the MS to report on the Femto cells to their RBS.

The main idea is that for each Femto BSC in the system 100, there is reserved one CGI or a small number of CGIs, and that the Routing Information is used together with the Local Identifier in the following manner:

The Routing information (i.e. the CGI) is used by the Macro BSC and the Core Network, mainly the MSC, to identify the Femto BSC.

The Local identifier is used together with the Routing information in the Femto BSC to identify the target Femto cell in the case of "hand in", i.e. hand over back to the Femto cell of a call which originated in the Femto cell. The Femto BSC will first check the received target cell CGI and then the Local Identifier to find out the target cell. This means that a single CGI and a 16-bit Local Identifier can be used to identify 65K Femto cells. If more Femto cells are supported by the system, then 2 CGIs could be used to identify 128K Femto cells. Other possibilities include extending the Local Identifier to e.g. 32 bits, which would allow a very high number of Femto cells to be identified with a single Routing Information CGI.

Thus, in conclusion, by means of the invention, the problem of identifying a Femto cell for the purpose of "hand in", i.e. to hand over a call to a Femto cell from a Macro cell in the case that the call was originally established in the Femto cell is solved in a manner which limits the changes which need to be made to existing BSCs so that no new interfaces need to be added. The information necessary for the "hand in" is dynamically updated using extensions of existing protocols in existing interfaces. For GSM and WCDMA, the node MSC 150 is not updated, since the extensions are already passed transparently via this node according to the existing system standards.

In addition, by means of the invention, Femto Cells can be dynamically added to the active mode neighbouring cell list in a Macro BSC, and the administration needed for CGI handling in the core network is simplified as only a very low number of CGIs need to be defined in the MSC to which the Femto BSC is connected. In a "best case" scenario, a single Routing Information CGI will be enough.

The invention is not limited to the examples of embodiments shown in the drawings and described above, but may be freely limited within the scope of the appended patent claims.

The invention claimed is:

1. A method for use in a cellular telephony network, said network comprising:
a first number of cells of a first kind, each of which is able to accommodate at least a first number of user terminals, with each cell, of the first number of cells, being controlled by a corresponding base station,
a second number of cells of a second kind, each of which is able to accommodate at least a second number of user terminals, with each cell, of the second number of cells, being controlled by a corresponding base station,
said second kind of cells being significantly much smaller than said first kind of cells and being located in or adjacent to a cell of the first kind,
the network also comprising:
control functions for control of the corresponding base stations for the first number of cells and the second number of cells, and
hand over functions for handing over control of user terminals from one base station to another base station,
the method being intended for use when an ongoing call of a user terminal in a cell of the second kind, being served by an original base station, is handed over to a base station of a cell of the first kind, the method comprising:

letting said control function for the base station of the cell of the second kind send identifying information to the control function of the base station of the first kind, which identifying information is such that if the call is to be handed back to the original base station of the cell of the second kind, the original base station can be identified and found by the network; and handing the call back to the originating base station using the identifying information.

2. The method of claim 1, where the identifying information includes:

information which enables the control function of the base station of the first kind to add the cell of the second kind to a list of cells which the user terminal listens to as possible candidates for hand over, information about the control function of the base station of the second kind, and information about the cell of the second kind.

3. The method of claim 2, where said identifying information is included in a new field in an existing information element in the system.

4. The method of claim 1, where the information which is sent in connection with the hand over from the cell of the second kind includes an indication of a time interval during which hand over back to the original base station of the second kind should not be carried out unless specific criteria are met.

5. The method of claim 2, applied to an GSM system, and according to which:

the identifying information is Base transceiver Station Identity Code/Absolute Radio Frequency Channel Number (BSIC/ARFCN) information, the information about the control function of the base station of the second kind is Channel State Information (CGI) of a Base Station Controller (BSC), and the information about the cell of the second kind is local information for that cell.

6. The method of claim 2, applied to a WCDMA system, and according to which:

the identifying information is a Universal Mobile Telecommunications System Terrestrial Radio Access Network (UTRAN) frequency and a scrambling code, the information about the control function of the base station of the second kind is a UTRAN cell identifier comprising a Public Land Mobile Network (PLMN) identifier, a Local Area Code (LAC), a Radio Network Controller (RNC) identifier, and a cell identity, the information about the cell of the second kind is local information for that cell.

7. A node for use as a Base Station Controller, BSC, in a cellular telephony network, said network comprising:

a first number of cells of a first kind, each of which is able to accommodate at least a first number of user terminals, with each cell, of the first number of cells, being controlled by a corresponding first base station, a second number of cells of a second kind, each of which is able to accommodate at least a second number of user terminals, with each cell, of the second number of cells, being controlled by a corresponding second base station, the second kind of cells being significantly much smaller than said first kind of cells and being located in or adjacent to a cell of the first kind, the system also comprising:

control functions for handing over control of user terminals from one base station to another base station, the BSC comprising:

a function for use when an ongoing call of a user terminal in a cell of the second kind, the base station of which is controlled by said BSC, is to be handed over to a base station of a cell of the first kind, said function of the BSC being able to send identifying information to the control function of the base station of the first kind, which identifying information is such that if the call is to be handed back to the original base station of the cell of the second kind, the base station can be identified and found by the network.

8. The BSC of claim 7, in which the identifying information sent by said function includes:

information which enables the control function of the base station of the first kind to add the cell of the second kind to a list of cells which the user terminal listens to as possible candidates for hand over, information about the control function of the base station of the second kind, information about the specific cell of the second kind.

9. The BSC of claim 8, in which said function includes the identifying information in a new field in an existing information element in the network.

10. The BSC of claim 7, in which the information which is sent by the function in connection with the hand over from the cell of the second kind includes an indication of a time interval during which hand over back to the base station of the second kind should not be carried out unless specific criteria are met.

11. The BSC of claim 8, for use in a GSM system, and in which:

the identifying information is Base transceiver Station Identity Code/Absolute Radio Frequency Channel Number (BSIC/ARFCN) information, the information about the control function of the base station of the second kind is Channel State Information (CGI) of that BSC, and the information about the specific cell of the second kind is local information for that cell.

12. The BSC of claim 8, for use in a WCDMA system, and in which:

the identifying information is the a Universal Mobile Telecommunications System Terrestrial Radio Access Network (UTRAN) frequency and a scrambling code, the information about the control function of the base station of the second kind is a UTRAN cell identifier comprising a Public Land Mobile Network (PLMN) identifier, a Local Area Code (LAC), a Radio Network Controller (RNC) identifier, and a cell identity, the information about the cell of the second kind is local information for that cell.

* * * * *

UNITED STATES PATENT AND TRADEMARK OFFICE
CERTIFICATE OF CORRECTION

PATENT NO. : 8,244,257 B2  Page 1 of 1
APPLICATION NO. : 12/524827
DATED : August 14, 2012
INVENTOR(S) : Walldeen et al.

It is certified that error appears in the above-identified patent and that said Letters Patent is hereby corrected as shown below:

In Column 3, Line 28, delete "inter alis," and insert -- inter alia, --, therefor.

In Column 10, Line 15, in Claim 7, after "the" delete "original".

In Column 10, Line 26, in Claim 8, after "about the" delete "specific".

In Column 10, Line 48, in Claim 12, after "is" delete "the".

Signed and Sealed this
Eighteenth Day of December, 2012

David J. Kappos
*Director of the United States Patent and Trademark Office*